United States Patent [19]
Lemak

[11] 4,219,851
[45] Aug. 26, 1980

[54] GROUP CODED RECORDING DATA RECOVERY SYSTEM

[75] Inventor: Nicholas S. Lemak, Phoenix, Ariz.

[73] Assignee: Honeywell Information Systems Inc., Phoenix, Ariz.

[21] Appl. No.: 963,639

[22] Filed: Nov. 24, 1978

[51] Int. Cl.² ............................................. G11B 5/09
[52] U.S. Cl. ....................................... 360/40; 360/43
[58] Field of Search ....................... 360/39, 40, 43, 51, 360/53

[56] References Cited
U.S. PATENT DOCUMENTS

| | | | |
|---|---|---|---|
| 3,879,752 | 4/1975 | Heidecker | 360/40 |
| 4,141,494 | 2/1979 | Fisher | 360/40 |

Primary Examiner—Vincent P. Canney
Attorney, Agent, or Firm—R. C. Fish; W. W. Holloway, Jr.; R. T. Reiling

[57] ABSTRACT

This relates to a digital data recovery system for decoding group coded data bits stored on magnetic tape whereon a "1" is represented by a flux reversal and an "0" is represented by the absence of a flux reversal with no more than two successive zeros throughout the data record. Input logic detects transitions of input data and forwards this information to an envelope detector which determines if subsequent transitions represent valid data. The presence of valid data enables a data rate detector which determines the average data rate. An output sequencer determines when a decoded output data bit should be generated and its proper polarity.

14 Claims, 6 Drawing Figures

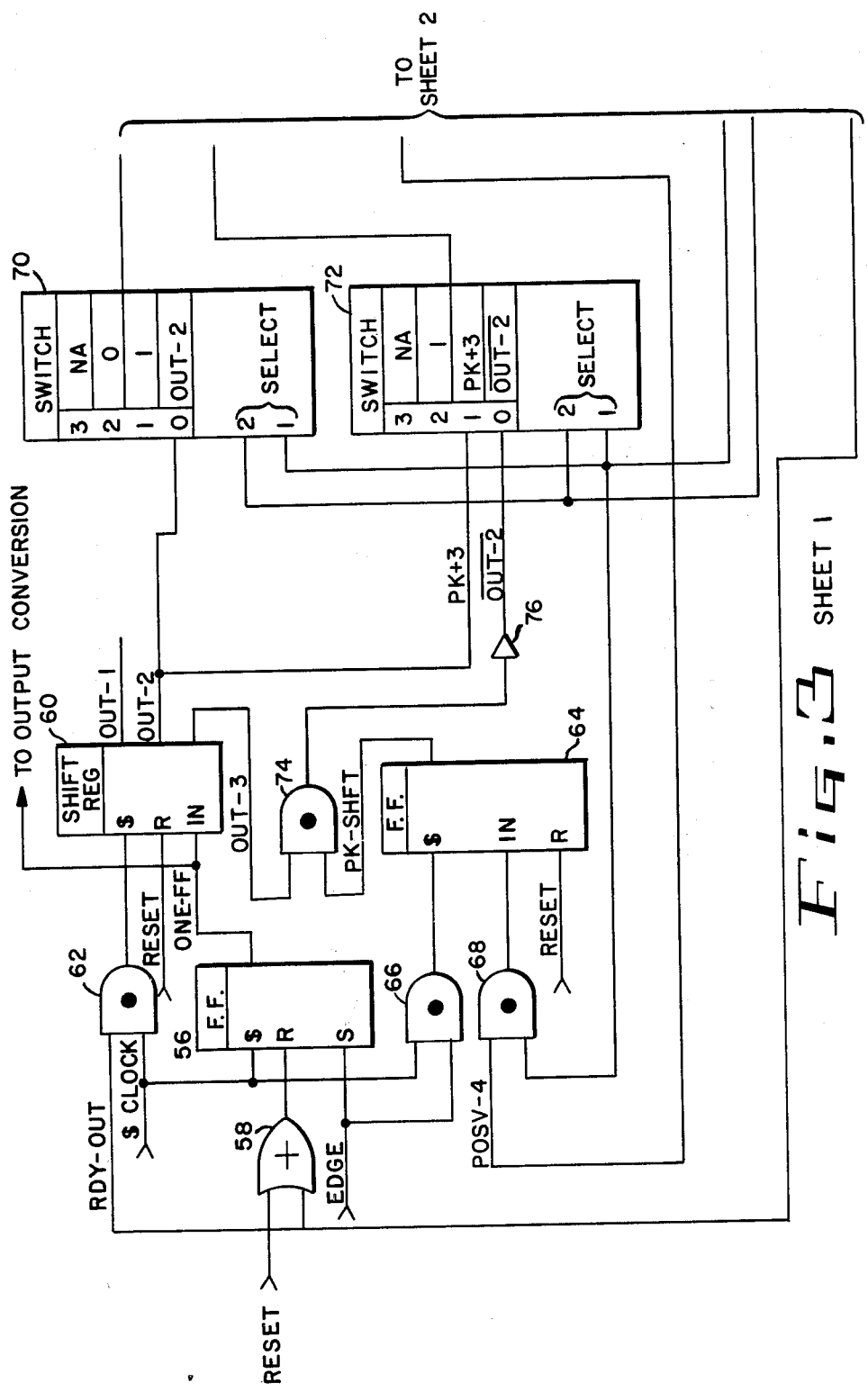
Fig. 3 SHEET 1

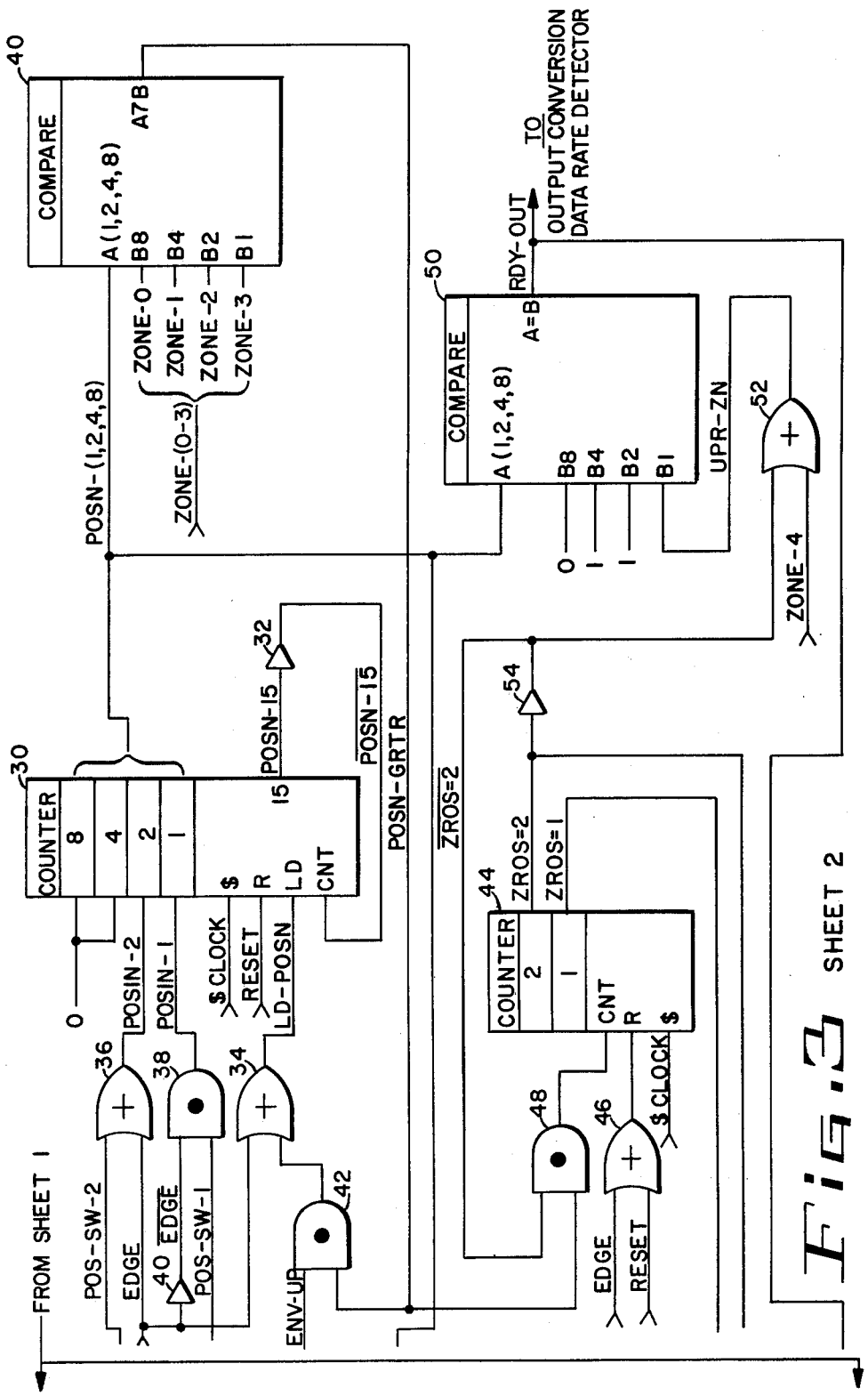
Fig.3 SHEET 2

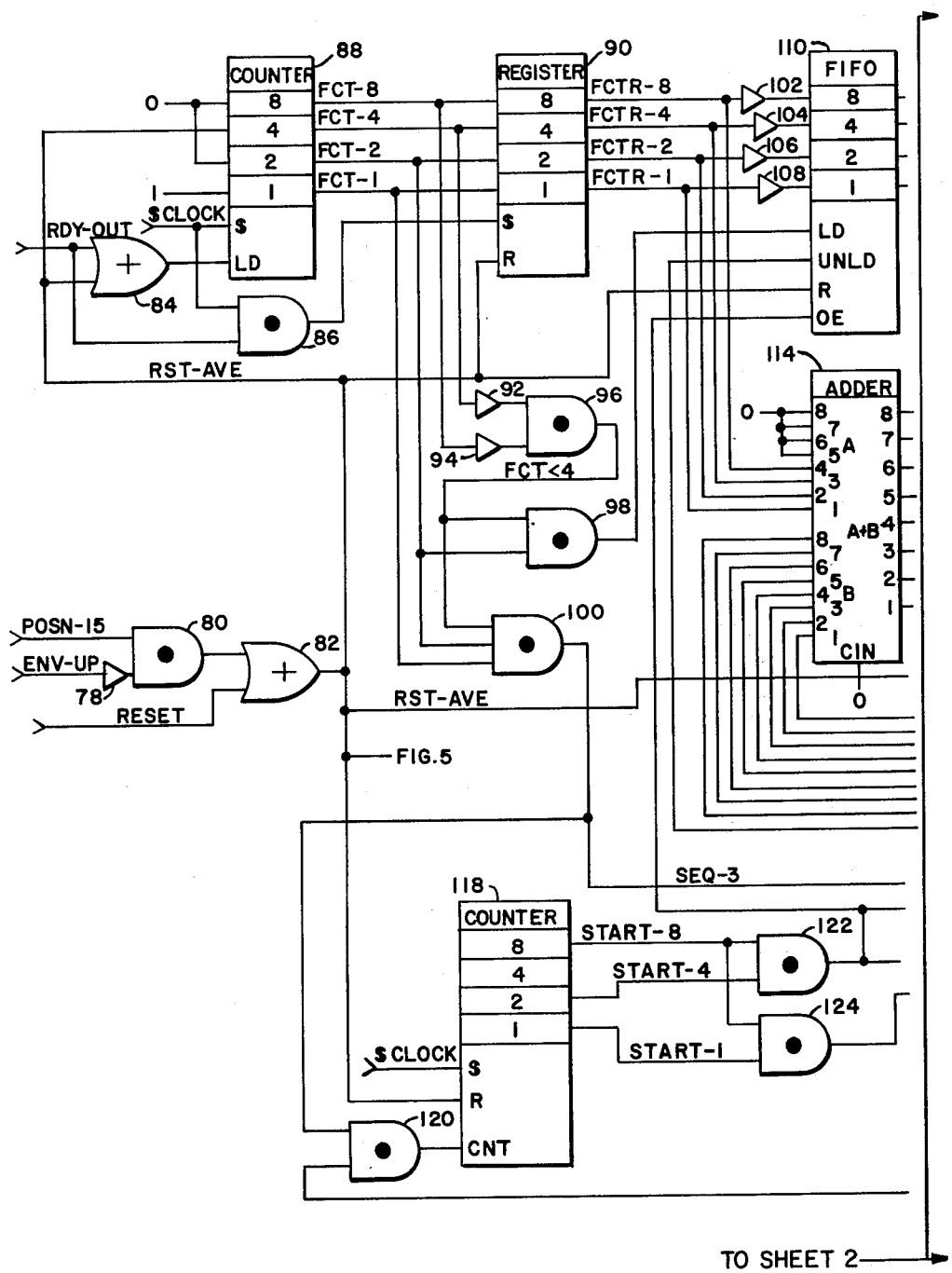
Fig.4 SHEET 1

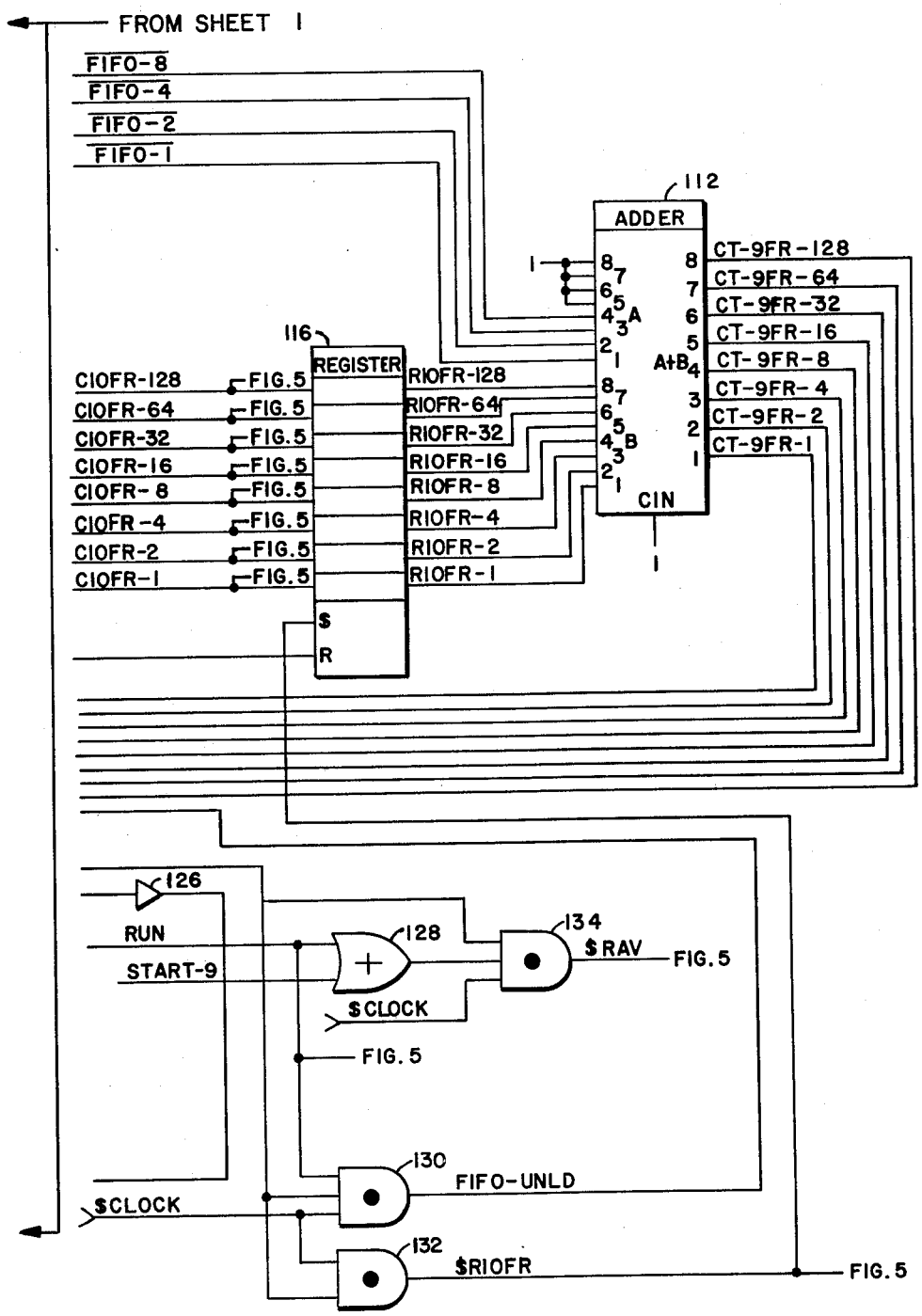
Fig. 4 SHEET 2

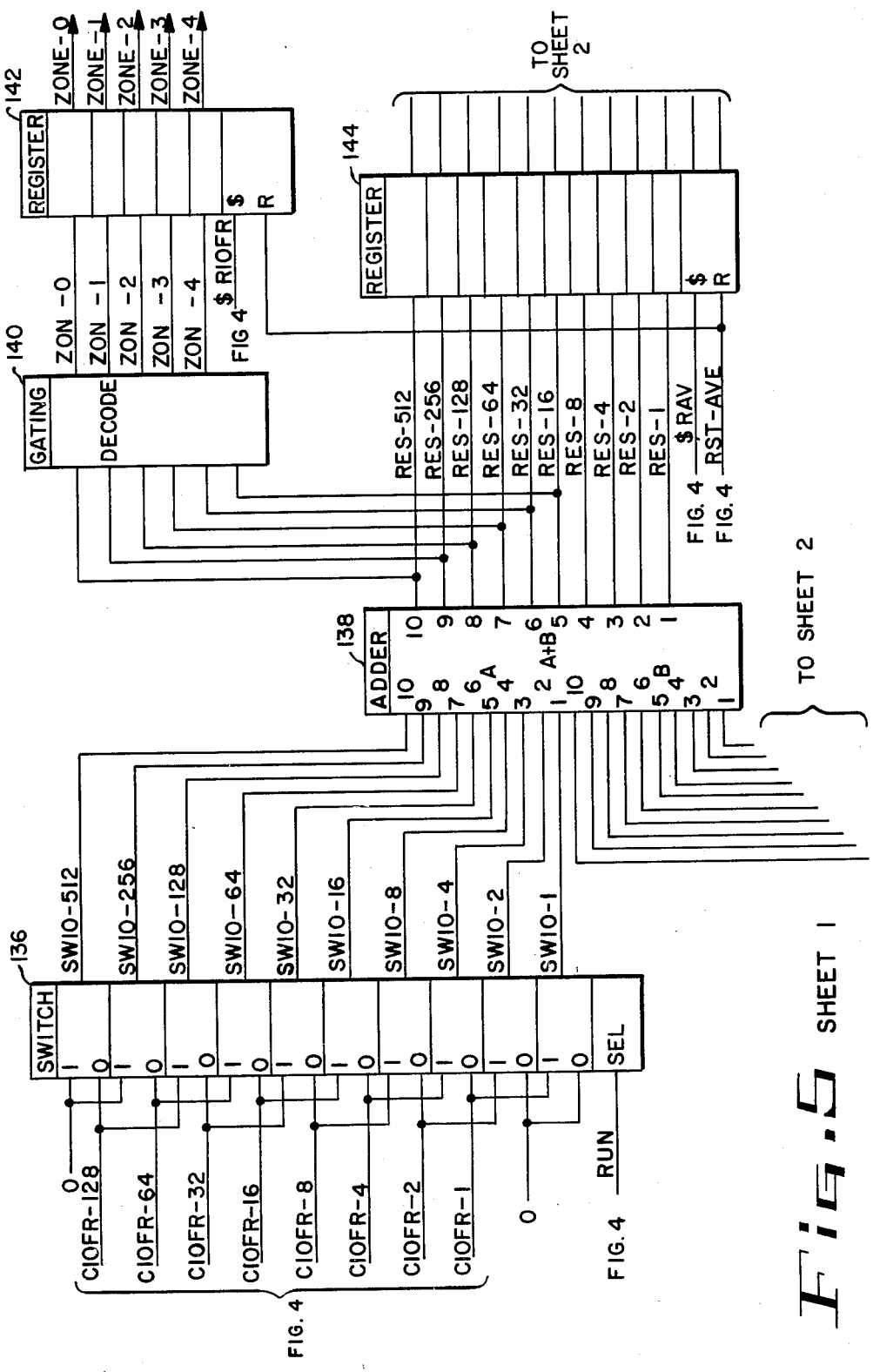

GROUP CODED RECORDING DATA RECOVERY SYSTEM

BACKGROUND OF THE INVENTION

1. Field of the Invention

This relates generally to the storage of data on magnetic mass storage media and, more particularly, to a digital group coded recording (GCR) data recovery system for receiving GCR data stored on magnetic tape.

2. Description of the Prior Art

Group coded recording (GCR) is generally employed in the storage of digital data on magnetic mass storage media (e.g. magnetic tape) and involves the encoding of data so that a single bit stream will contain no more than two successive 0's throughout the data record. The coded data is then written on the magnetic medium at some predetermined consistent spacing such that a "1" is represented by a magnetic flux reversal and a "0" is represented by the absence of a magnetic flux reversal.

U.S. Pat. No. 3,639,900 shows an error detection and correction system for use in GCR systems. It is cited as background material to put the invention of the present application in perspective with respect to the larger GCR system. The invention of the pending application could be used in the system of the cited reference between elements 13 and 14 in FIG. 1 therein. The invention disclosed here would improve data recovery from relatively "dirty" signal from the magnetic media by comparing the incoming signal with the average output data rate from the invention so as to better predict when an incoming signal represents a valid flux reversal on the magnetic media. The invention utilizes the data from this comparison to predict the actual data recorded on the magnetic media and to signal the proper time and polarity of an output data bit generated by the output means described herein.

It has heretofore been known in the industry to recover GCR data through the use of analog equipment. The most common method employs a variable frequency oscillator running at a frequency which is maintained at a multiple of the data rate which is being read. In addition to the variable frequency oscillator, a phase sensing device is employed to control the sampling position of the data. This "analog" approach suffers from several disadvantages. First, the analog approach requires unique test equipment and highly trained personnel to effect proper operation, trouble shooting and repairs. Second, the analog equipment experiences some degree of frequency drift resulting in variations in performance and requiring periodic recalibration. Third, the equipment requires the inclusion of components which permit tuning and adjusting to effect compatibility with different data rates.

It is also known to employ a digital data recovery method in the recover of phase encoded data stored on magnetic tape. However, this approach has been used only with relatively low data frequencies i.e. 3,200 bits per inch when no more than one successive "0" is contained in valid data and wherein no data variations are encountered. This approach is not applicable to GCR wherein substantial data variations are encountered specifically in relation to peak shift and rapid excursions of the data signal which are not representative of valid data and wherein the data frequencies are substantially higher (i.e. 9,200 bits per inch).

SUMMARY OF THE INVENTION

It is an object of the present invention to provide a GCR data recovery system which receives a bit stream from a magnetic media handler which is in the form of series of polarity reversals corresponding to flux reversals on the media.

It is a further object of the invention to account for all variations of data caused by the media and media handler as specified by the American National Standards Institute in ANSI X3.54 dated June 10, 1976.

It is yet a further object of the invention to provide encoded data including indications of transitions occurring in such a fashion as to make the output indeterminate to a data decoder.

It is another object of the present invention that the performance of the GCR data recovery system be consistent throughout the life of the product.

Yet another object of the invention is that the GCR data recovery system be capable of being maintained and tested with ordinary digital equipment both in the factory and in the field.

It is a still further object of the invention that the inventive GCR data recovery system accomodate any data rate up to a designed limit with identical performance characteristics by merely the proper selection of an appropriate input clock frequency.

Finally, it is the object of the present invention that maintenance personnel require training only in the repair of digital equipment in general.

According to a broad aspect of the invention there is provided a digital data recovery system for decoding group coded data bits stored on magnetic media in the form of flux reversals wherein a "1" is represented by a flux reversal and an "0" is represented by the absence of a flux reversal with no more than two successive zeros throughout the data record, comprising:

first means for detecting the presence and absence of flux reversals;

second means coupled to said first means for recognizing when said flux reversals represent valid data;

third means coupled to said first and second means for predicting the position and polarity of each of the output data bits;

fourth means coupled to said second and third means for calculating the average data bit rate; and output means coupled to said first, second and third means for generating the decoded data.

The above and other objects of the present invention will be more clearly understood from the following detailed description taken in conjunction with the accompanying drawings in which:

BRIEF DESCRIPTION OF THE DRAWINGS

FIG. 3 is a logic diagram of the output sequencer shown in FIG. 1;

FIG. 4 is a logic diagram of a rolling 10-frame count generator used in the data rate detector of FIG. 1;

DESCRIPTION OF THE PREFERRED EMBODIMENT

Figure 1:
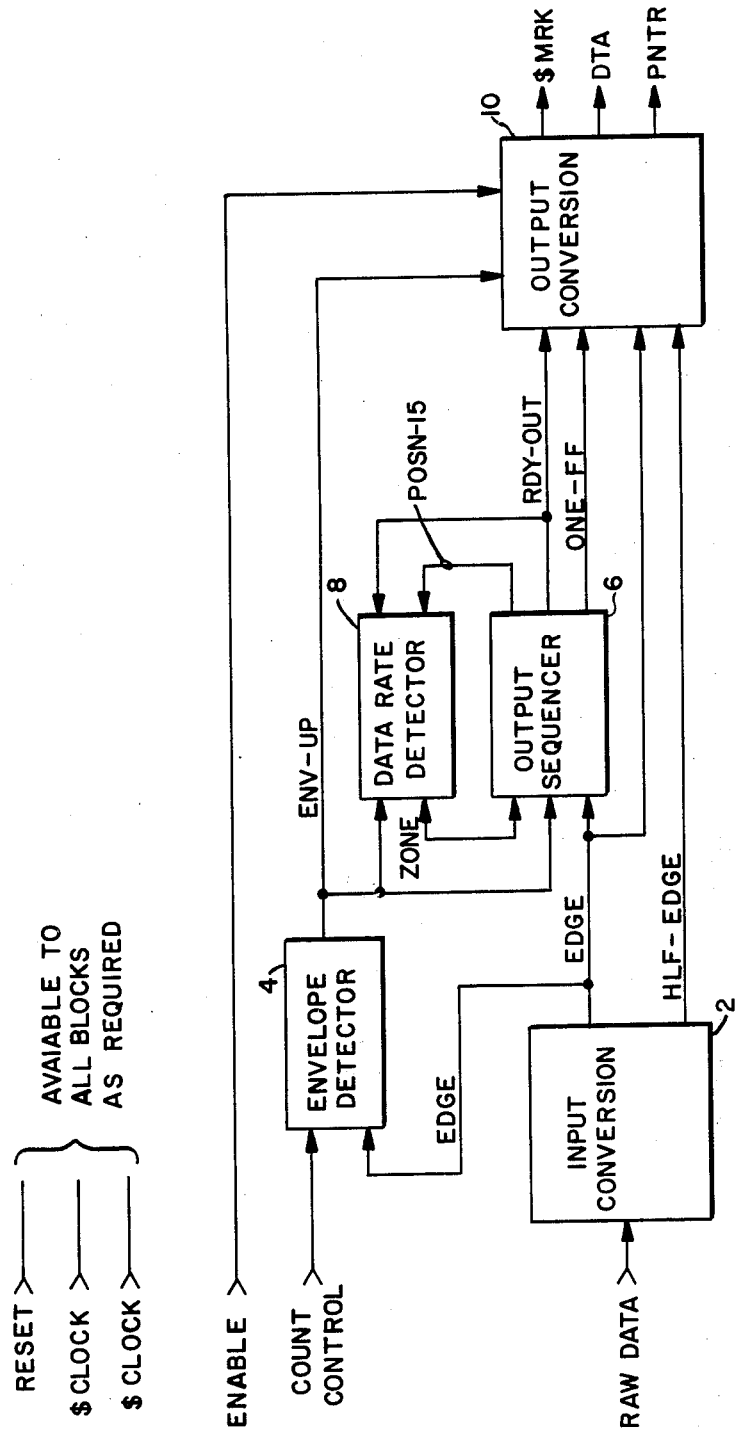
FIG. 1 is a block diagram of a GCR data recovery system according to the present invention.

FIG. 1 is a block diagram of the inventive data recovery apparatus. Raw data which is in the form of a logic signal which changes polarity in accordance with flux reversals on magnetic tape, is received by input conversion unit 2. This unit performs four functions. First, it synchronizes the incoming data with the system clock. Second, it eliminates erroneous short-duration excursions to the opposite polarity which are defined to be less than 30% of the nominal distance between two successive flux reversals. Third, it provides a signal (EDGE) which is true for the duration of one clock period and whose occurrence is representative of transitions of the synchronized input data. Fourth, it provides a second signal (HLF-EDGE) which is true for the duration of one clock period and is representative of the transitions of input data which occur during the first half of a clock period.

Envelope detector 4 monitors the occurrence of the EDGE signal. After a sufficient number of signals have been detected, which number is defined by a count control input, a signal (ENV-UP) is generated which is used as an enabling signal to the remainder of the apparatus. The number of EDGE signals required to set the ENV-UP signal is defined by the above cited ANSI specification and corresponds to the number of pulses in the preamble of the data group. That is, after a specified number of pulses of a data group are detected, the remainder of the apparatus it enabled thus informing it that data will follow. Envelope detector 4 will also detect the termination of EDGE signals and, after a similar predetermined interval, will cause the enabling signal (ENV-UP) to cease. history of output data and the average data rate (ZONE) in order to determine the appropriate time to generate an output (RDY-OUT) and the polarity of the output (ONE-FF).

Data rate detector 8 monitors the rate of the output signal (RDT-OUT), applies averaging techniques and generates an output (ZONE) which is indicative of the average data rate. The average data rate is supplied as a binary number which indicates the number of half clock periods in one average data period. The host system, not shown, defines the requirement for data recovery by causing an enabling signal (ENABLE) to be applied to output conversion unit 10. When both ENABLE and ENV-UP are true, output conversional unit 10 is operational and monitors the states of RDY-OUT, ONE-FF, EDGE and HLF-EDGE in order to determine when and at what polarity to output data (DTA) with its corresponding strobe (MRK). In addition, a determination is made as to the occurrence of a possible error. If an error condition is satisfied, an output (PNTR) will be generated and a corresponding output strobe ($MRK) will occur.

The "RESET" and "$CLOCK" signals are applied at the discretion of the host system. The RESET signal is used to initialize the data recovery logic. The $CLOCK signal is used by the data recovery logic for timing purposes and sequencing control. This clock signal must be applied at a frequency equal to ten times the nominal data rate that is expected, and with a 50% duty cycle. The $CLOCK signal is the compliment of $CLOCK. The decision transition of $CLOCK as used in following description will be the positive to negative transition of the signal. Each block of FIG. 1 will be described individually and in more detail below.

Figure 2:
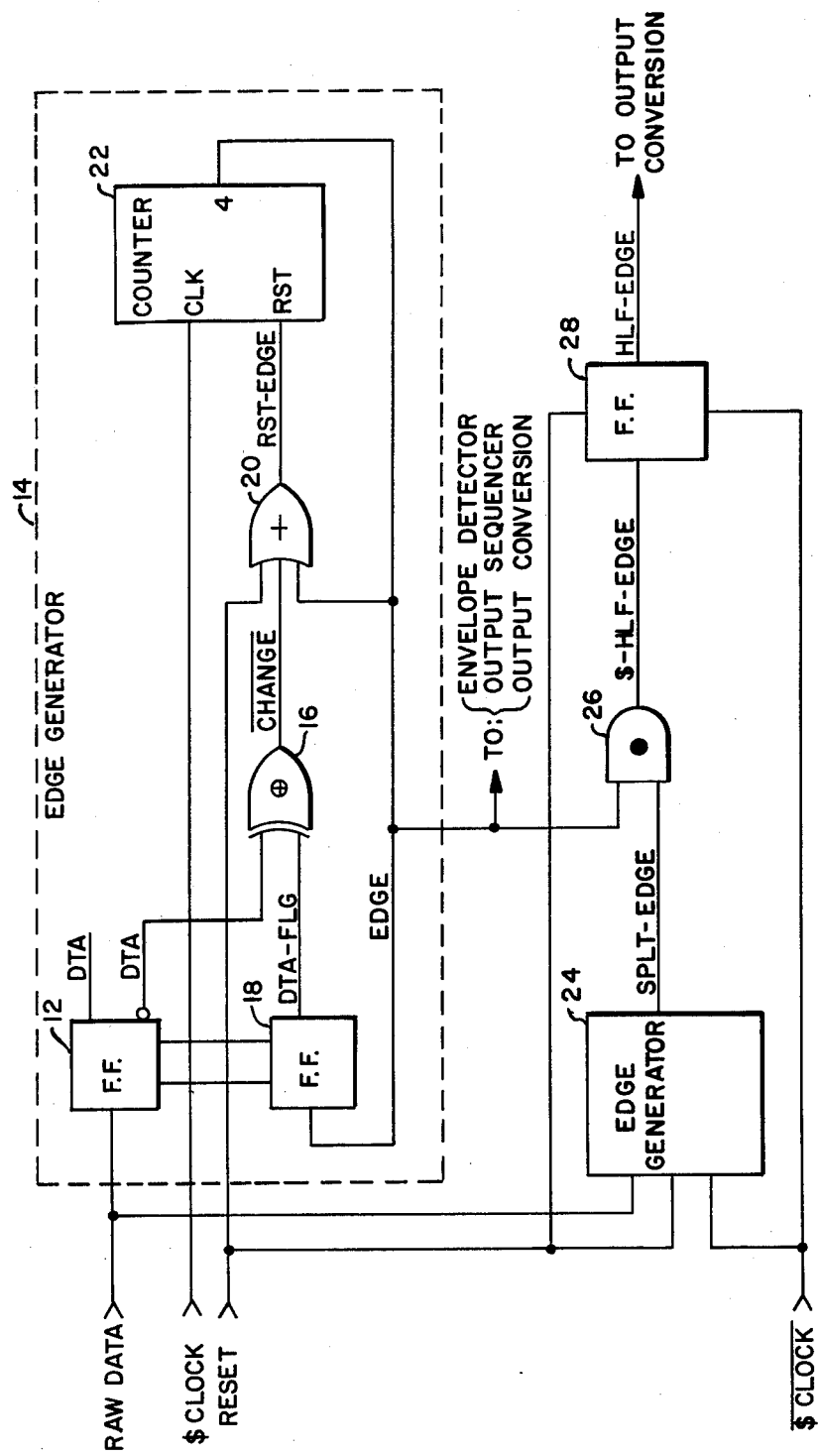
FIG. 2 is a more detailed diagram of the input conversion logic shown in FIG. 1.

FIG. 2 is a more-detailed diagram of the input conversion unit shown in FIG. 1. Raw data is received by a flip flop 12 in EDGE generator 14, flip flop 12 having outputs DTA and $\overline{\text{DTA}}$. The raw input data is asynchronous with the $CLOCK signal which is used by flip flop 12; therefore, flip flop 12 must be one which exhibits a high degree of probability of stabilizing within a known period of time under these conditions. The complimentary output ($\overline{\text{DTA}}$) of flip flop 12 is applied as one input of an "EXCLUSIVE OR" gate 16. The output of a second flip flop 18 (DTA-FLG) is applied to the second input of gate 16. The system RESET, CHANGE (gate 16) and EDGE (counter 22) are applied to "OR" gate 20 having an output RST-EDGE which is applied to binary counter 22. The system clock is likewise applied to counter 22.

Counter 22 remains in a RESET state as long as the output of "OR" gate 20 remains true. When the output of "OR" gate 20 becomes false, counter 22 will begin counting the system clock signal. After the fourth such signal, the counter will output an EDGE signal. This EDGE signal is fed back to "OR" gate 20 and causes RST-EDGE to become true, resetting counter 22 on the next system clock signal and thus turning off the EDGE signal.

The EDGE signal is also applied to flip flop 18 such that when the EDGE signal becomes true, flip flop 18 will invert its output polarity upon the next system clock. The EDGE signal as described above is applied to the envelope detector 4, output sequencer 6 and output conversion unit 10.

EDGE generator 24 contains logic identical to that contained in EDGE generator 14 with the exception that it is driven by the inverted clock signal $\overline{\text{$CLOCK}}$. This configuration causes sampling of raw data transitions at the center of the $CLOCK. The output of edge generator 24 is termed SPLT-EDGE and is applied along with the EDGE signal to inputs of "AND" gate 26 which produces an output signal S-HLF-EDGE. This signal is in turn applied to flip flop 28 whose output corresponds to the above described HLF-EDGE signal. The $\overline{\text{$CLOCK}}$ signal is applied to flip flop 28. On every positive to negative transition of $\overline{\text{$CLOCK}}$ the polarity of S-HLF-EDGE is sampled, and the HLF-EDGE flip flop 28 is set or reset accordingly. Flip Flop 28 will become set only as a result of incoming raw data transitions which occurred on the first half of the $\overline{\text{$CLOCK}}$. As described above, the output of flip flop 28 (HLF-EDGE) is applied to output conversion unit 10, FIG. 1.

When a pulse is received on the data line to flip flop 12, it is set on the next clock signal. At this time $\overline{\text{DTA}}$ and DTA-FLG are "zero" resulting in a "zero" at CHANGE. Since RESET and EDGE are likewise "zero", a zero will be applied to the reset input of counter 22. Counter 22 thus begins to count $CLOCK pulses and when a count of four is reached an EDGE signal is generated causing the output of flip flop 18 (DTA-FLG) to be set. Also, the EDGE signal is applied to "OR" gate 20 causing a "one" to be applied to the reset input of counter 22. If the data pulse received by flip flop 12 does not last long enough to permit counter 22 to reach a count of four, flip flop 12 will be reset on the next clock period following the end of the data pulse. This will result in a "one" being applied to the reset input of counter 22 causing it to reset to the "zero" state.

Referring again to FIG. 1, envelope detector 4 receives the EDGE signal from counter 22 (FIG. 2) and a count control signal from the host system. Detector 4 detects the presence of phase encoded data which is being transmitted from the data storage medium. The detector generates an output signal at a predetermined time after detecting the presence of data and continues to provide such an output signal for a predetermined time after detecting the end of the data. The time periods at which the output signals are generated are different depending upon the nature of the data transfer operation, such time periods corresponding to different instructions in the control store. Thus, the presence of an output (ENV-UP) indicates that data is being transmitted by the storage medium. An envelope detector suitable for use in the system of FIG. 1 is shown and described in U.S. Pat. No. 4,053,738 issued Oct. 11, 1977 and entitled "PROGRAMMABLE DATA ENVELOPE DETECTOR". Since the details of operation and structure can be found in the above cited patent, further discussion here is not deemed necessary.

FIG. 3 is a more detailed logic diagram of the output sequencer shown in FIG. 1. Position counter 30 is a 4-bit binary counter having outputs POSN-1, POSN-2, POSN-4 and POSN-8. This counter is synchronous and performs state changes upon the positive to negative transition of the clock signal. The purpose of position counter 30 is to keep track of the number of clock periods which have occurred since the last EDGE signal from input conversion unit 2 (FIG. 1). If no EDGE signal occurs, the position counter, if not otherwise reset, will count the maximum count of fifteen at which time the POSN-15 output (also shown in FIG. 1) is inverted in inverter 32 and thereafter applied to the count enable input of position counter 30 such that further counting is inhibited until either a reset signal is applied to the R input of counter 30 or a load signal is applied to the LD input of counter 30.

Each occurrence of an EDGE signal causes the position counter to be preloaded. The LD input is coupled to the output of OR gate 34 having a first input coupled to the EDGE signal.

The value loaded into counter 30 is controlled as follows. The third and fourth bits of counter 30 are loaded with 0's since their corresponding inputs are permanently coupled to a logic 0. The second most significant bit is coupled to the output of OR gate 36 which had one input coupled to the EDGE signal. Therefore, an EDGE signal will cause the second most significant bit of counter 30 to be loaded with a logic "1" but at any other time the value of signal POS-SW-2 will be loaded into the second MSB.

The first bit of position counter 30 is driven by "AND" gate 38 having a first input coupled to the EDGE signal after inversion in inverter 40. This signal shall be referred to as EDGE. Therefore, when a counter 30 is loaded as a result of an occurrence of an EDGE signal, a logic "0" will be loaded into the least significant bit. Loading of counter 30 at any other time will result in the least significant bit being loaded with the value of signal POS-SW-1 which is applied to the second input of AND gate 38.

The output of position counter 30 is coupled to inputs of a comparator 40 which compares the count with the value of ZONE-0-3 signals. These zone signals are generated by the data rate detector (to be discussed in more detail below) and represent a number which is one less than the number of clock periods within an average input data period. The output of comparator 40 (POSN-GRTR) becomes true when the number in counter 30 becomes greater than the number represented by the ZONE signals. This POSN-GRTR signal is applied as one input to AND gate 42. The second input is coupled to the above referred to ENV-UP signal. If the ENV-UP signal is false, the POSN-GRTR signal has no effect on position counter 30. If, however, the ENV-UP signal is true (after envelopes are detected), the POSN-GRTR signal when true will cause position 30 to be loaded via OR gate 34. As stated previously, the third and fourth most significant bits of counter 30 will be loaded with a logical "0", the second most significant bit will be loaded with the value of POSN-SW-2 unless an EDGE signal is true in which case it will be loaded with a logical "1", and the least significant bit will be loaded with the value of POS-SW-1 unless an EDGE signal is true in which case it will be loaded with a logical "0".

Counter 44 is a two-bit binary counter which counts the number of times the position counter 30 has been reloaded between successive EDGE signals. This is necessary in order to adjust circuits which determine POS-SW-2 and POS-SW-1 in the manner to be described below. Counter 44 has two outputs, ZROS=1 and ZROS=2. Counter 44 is synchronous and performs all state changes solely upon a positive to negative transition of the clock signal applied to its clock input.

The reset (R) input of counter 44 is coupled to the output of "OR" gate 46 having a RESET signal from the host processor as a first input and the EDGE signal as a second input. The occurrence of either will reset counter 44 causing ZROS=1 and ZROS=2 to become false.

The count enable (CNT) control of counter 44 is driven by the output of "AND" gate 48. Gate 48 has coupled to its first input the POSN-GRTR signal from comparator 40 and has coupled to its second input ZROS=2 from counter 44. Thus, counter 44 will increment whenever the POSN-GRTR signal is true and the ZROS=2 signal is false. As should be clear, counter 44 will inhibit counting when it reaches a value of 2 and will be able to count again only if it is first reset by the output of gate 46.

The outputs of position counter 30 are applied to a second comparator 50 where the count in counter 30 is compared with a predetermined number. As can be seen from FIG. 3, the B8 input of comparitor 50 is tied to a logical "0" and the B2 and B4 inputs are tied to logical 1's. The B1 input is driven by the output of OR gate 52, the first input of which is coupled to ZROS=2 from counter 44 via inverter 54. The second input of OR gate 52 is coupled to a signal ZONE-4 to be described below. Thus, a logical "1" will appear at B1 if ZROS=2 is false or ZONE-4 is true.

The output of comparator 50 (RDY-OUT) becomes true whenever the contents of position counter 30 is seven if ZROS=2 is false; six if ZROS=2 is true and ZONE-4 is false; or seven if ZROS=2 is true and ZONE-4 is true. The RDY-OUT signal from comparator 50 indicates the appropriate time for transmission of an output data bit and is forwarded to the output conversion unit 10 (FIG. 1). This RDY-OUT signal is also forwarded to the data rate detector 8 (FIG. 1) and is additionally used within the output sequencer itself.

The output of a flip flop 56 is employed to indicate the polarity of the data which is to be output with the RDY-OUT signal. This output is denoted ONE-FF. Flip Flop 56 is synchronous and changes state only upon a positive to negative transition of the clock signal. The set input of flip flop 56 is driven by the EDGE signal; thus, the signal ONE-FF will become true one clock period after the EDGE signal becomes true. The reset input of flip flop 56 is driven by the output of OR gate 58 having a first input coupled to the host system reset signal and a second input coupled to the RDY-OUT signal from comparator 50. Thus, flip flop 56 will be reset one clock period after either the host reset signal or the RDY-OUT signal. In this case, the set input when true overrides the reset input. The resulting ONE-FF signal is used both internally by the output sequencer and is also sent to output conversion logic 10 (FIG. 1).

In order to determine the correct quantity with which to load position counter 30, information regarding the polarity of the last three data outputs transmitted and the peak shift which was experienced prior to the occurrence of the last EDGE signal is required. Shift register 60 retains the polarity of the last three data outputs which are termed OUT-1, OUT-2 and OUT-3. The OUT-1 signal is the last data output transmitted, OUT-2 is the last OUT-1 and OUT-3 is the last OUT-2. Data is shifted in shift register 60 one position on every occurrence of the positive to negative transistion of the output of AND gate 62 applied to the clock input of shift register 60. Coupled to a first input of AND gate 62 is the RDY-OUT signal; coupled to the second input is the system clock signal. When both are true, the logical one will appear at the output of AND gate 62. The data-in input of shift register 60 is coupled to the ONE-FF output of flip flop 56. Shift register 60 also has a reset capability which is coupled to the reset signal from the host system.

As stated previously, the inventive group code recording apparatus must be able to accommodate a certain degree of peak shift. Such peak shift is detected by flip flop 64. This is accomplished as follows. A first AND gate 66 having an output coupled to the clock input of flip flop 64 has applied to a first of its inputs the EDGE signal and to a second of its inputs the system clock signal. Thus, the occurrence of an EDGE signal will gate the system clock signal through AND gate 66 to the clock input of flip flop 64. A second AND gate 68 has an output coupled to the set or data-in input of flip flop 64. AND gate 68 has coupled to the first of its inputs the ZROS=1 output of counter 44 and has coupled to a second of its inputs the POSN-4 output of position counter 30. The RESET signal of the host system is coupled into the RESET input of flip flop 64. If counter 30 is loaded a second time (the first occurring when the last EDGE signal occurred), counter 44 will be incremented such that the signals ZROS=1 becomes a logical "1". If subsequently, position counter 30 reaches a count such that the position POSN-4 signal becomes true, and an EDGE signal occurs substantially simultaneously therewith, flip flop 64 will be set indicating that peak shift exists. That is, the PK-SHFT output of flip flop 64 will become a logical "1".

Switches 70 and 72 control the loading of position counter 30 in order to adjust the decision-making function of comparator 40 when peak shift is suspected. Before embarking on a discussion of how this is accomplished, it should be noted that the amount of peak shift is related to the relative positions of 1's and 0's in the data stream. It is for this reason that shift register 60 records a history of the last data bits.

Switch 70 has applied to one of its inputs, the OUT-2 output (second last data bit) output of shift register 60. Switch 70 likewise has first and second select inputs which are coupled to the ZROS=1 and ZROS=2 outputs respectively of counter 44. Switch 72 has similar select inputs coupled to ZROS=1 and ZROS=2 signals of counter 44. Switch 72 has two additional inputs, the first of which is coupled to the output of AND gate 74 which has a first input coupled to the output of flip flop 64 (PK-SHFT) and a second input coupled to the OUT-3 output of shift register 60. The final input of switch 72 is coupled to the OUT-2 output of shift register 60 after inversion in inverter 76.

When counter 44 contains a count of 0 (ZROS=1=0 and ZROS=2=0) switch 1 will output the signal $\overline{\text{OUT-2}}$ to the POS-SW-1 input to AND gate 38. Switch 70, on the other hand, outputs the OUT-2 signal to the POS-SW-2 input of OR gate 36 thus, if the OUT-2 output of shift register 60 is an 0, counter 30 will be loaded with the number 1 assuming no simultaneous occurrence of an EDGE signal.

If counter 44 contains a 1 count (i.e. ZROS=1=1, ZROS=2=0) the 1 will be applied to the POS-SW-2 input of OR gate 36 and the output of AND gate 74 (PK+3) will be applied to the POS-SW-1 input of AND gate 38. Thus, if peak shift has been detected by flip flop 64 and the OUT-3 signal is a logical "1", counter 30 will be loaded with a count of 3 whereas if no peak shift has been detected or if the OUT-3 is a logical "0" counter 3 will be loaded with a count of 2. Again assuming no simultaneous occurrence of an EDGE signal.

Finally, if the contents of counter 44 is 2 (i.e. ZROS=1=0 and ZROS=2=1, switch 72 will output a 1 to the POS-SW-1 input of AND gate 38 and switch 70 will output a 0 to POS-SW-2 input of OR gate 36 thus loading counter 30 with a count of 1.

This process of selectively loading position counter 30 in effect either lengthens or shortens the period of time to the next data decision point depending on the state of counter 44, the presence or absence of peak shift, and the past data history as stored in shift register 60.

It should be noted that a count of 3 in counter 44 (i.e. ZROS=1=1 and ZROS=2=1 is an invalid condition and therefore has no effect on the loading of counter 30.

Data rate detector 8 shown in FIG. 1 supplies a binary number consisting of signals ZONE 0-4 which is representative of the number of system clock periods contained within an average data frame period which is being experienced. As stated previously, the system clock frequency is chosen such that there are exactly ten clock periods in the specified nominal data frame period. The range to be provided in the ZONE field is from 7(01110) through 11.5 (10111).

The data rate detector accomplishes its task in a twostep process. In the first step, a number is provided which defines the number of clock periods that were consumed by the last ten data frames. This count is updated after each data frame. The apparatus for performing this function is referred to as a rolling ten frame count generator and is shown in detail in FIG. 4. The ten frame count is provided in binary form by signals CIOFR-1 though CIOFR-128.

The second step in the process involves taking the output of the rolling ten frame count generator integrating this value and decoding the final quantity to provide the ZONE field. The integration is required to provide smoothing such that the Zone field will not respond to extremely rapid variations in the data frame width which are not representative of changes in data frequency. The apparatus for carrying out this integration and decoding is referred to as the average integrator and is shown in detail in FIG. 5.

Referring to FIG. 4, the apparatus shown is reset by either a reset signal from the host system or the coincidence of a POSN-15 signal from position counter 30 (FIG. 3) and the absence of an ENV-UP signal. The POSN-15 signal is applied to a first input of AND gate 80. The ENV-UP signal is applied to a second input of AND gate 80 after inversion in inverter 78. The output of gate 80 is applied to a first input of OR gate 82, the second input of OR gate 82 being coupled to the system RESET signal. The output of OR gate 82 is responsible for resetting the apparatus of the rolling ten frame count generator with signal RST-AVE.

Binary counter 88 counts the number of clock signals which have occured in each data frame. As may be seen, the least significant bit of counter 88 is hard wired to a logical 1 while the second and fourth most significant bits are hard wired to a logical 0. Upon the occurrence of a RDY-OUT signal, counter 88 is loaded via OR gate 84 with a count of 1. The clock signal applied to counter 88 and the RDY-OUT signal applied to OR gate 84 are both applied to inputs of AND gate 86, such that when counter 88 is loaded as a result of the RDY-OUT signal, the contents of counter 88 just prior to loading are transferred via outputs FCT-1, 2, 4, 8 to FETR register 90. The outputs of register 90, FCTR 1, 2, 4, 8 are applied via inverters 108, 106, 104 and 102 respectively to the inputs of a first in-first out (FiFo) register bank 110 which holds the counts for ten data frames.

Register 116 having outputs RIOFR-1, 2, 4, 8, 16, 32, 64, 128 is used to store the count for the last ten data frames.

Adder 112 has a first set of inputs coupled in part to the outputs of FiFo register 110, and a second set of inputs coupled to the outputs of RIOFR register 116. In this manner, adder 112 subtracts the data frame count of the tenth previous data frame from the ten frame counts (RIOFR) stored in register 116 thus producing a 9 frame count CT-9FR-1, 2, 4, 8, 16, 32, 64, 128. A second adder 114 has a first set of inputs coupled in part to the outputs of FCTR counter 90 and a second set of inputs coupled to the outputs of adder 112. The two counts are added in adder 114 to produce a new ten frame count CIOFR-1, 2, 4, 8, 16, 32, 64, 128.

Referring back to FCT counter 88, the third and fourth most significant outputs (FCT-4 NFCT-8) are applied after inversion in inverters 92 and 94 to AND gate 96, the output of which forms a first input to AND gate 98. The second input to AND gate 98 is formed by the second most significant output (FCT-2) of counter 88, and the output of AND gate 98 is coupled into the load control input of FiFo register 110. The signals FCT-1 and FCT-2 from counter 88 are also applied to first and second inputs of AND gate 100. The third input of which is formed by the output of AND gate 96. The output of AND gate 100 is termed SEQ-3 and is used in the manner to be described below.

The accumulation of the counts is controlled by a four bit binary counter 118 having outputs START-1, START-2 and START-8. The outputs START-8 and START-2 are applied to inputs of AND gate 122. Signal START-1 and START-8 are applied to inputs of AND gate 124. The output of AND gate 122 termed RUN is applied to the output enable input of FiFo register 110 and, after inversion in inverter 126 to a first input of AND gate 120 having an output coupled to control input of counter 118. The second input to AND gate 120 is coupled to the SEQ-3 signal from AND gate 100. The RESET input of counter 118 is coupled to the RST-AVE signal from OR gate 82.

The start-9 signal from AND gate 124 and the RUN signal from AND gate 122 are applied to first and second inputs of OR gate 128, the output of which is coupled to a first input of AND gate 134. The RUN signal is likewise applied to a first input of AND gate 130. The SEQ-3 signal from AND gate 100 is applied to a second input of AND gate 134, to a second input of AND gate 130 and to a first input of AND gate 132. The system clock signal forms the second input to AND gate 132, the third input to AND gate 130 and the third input to AND gate 134. The output of AND gate 132 ($RIOFR) is applied to the clock input of register 116, and the output of AND gate 130 (FIFO-UNLD) is applied to the unload input of FiFo register 110. The output of AND gate 134 ($RAV) is used in a manner to be described below.

Figure 5:
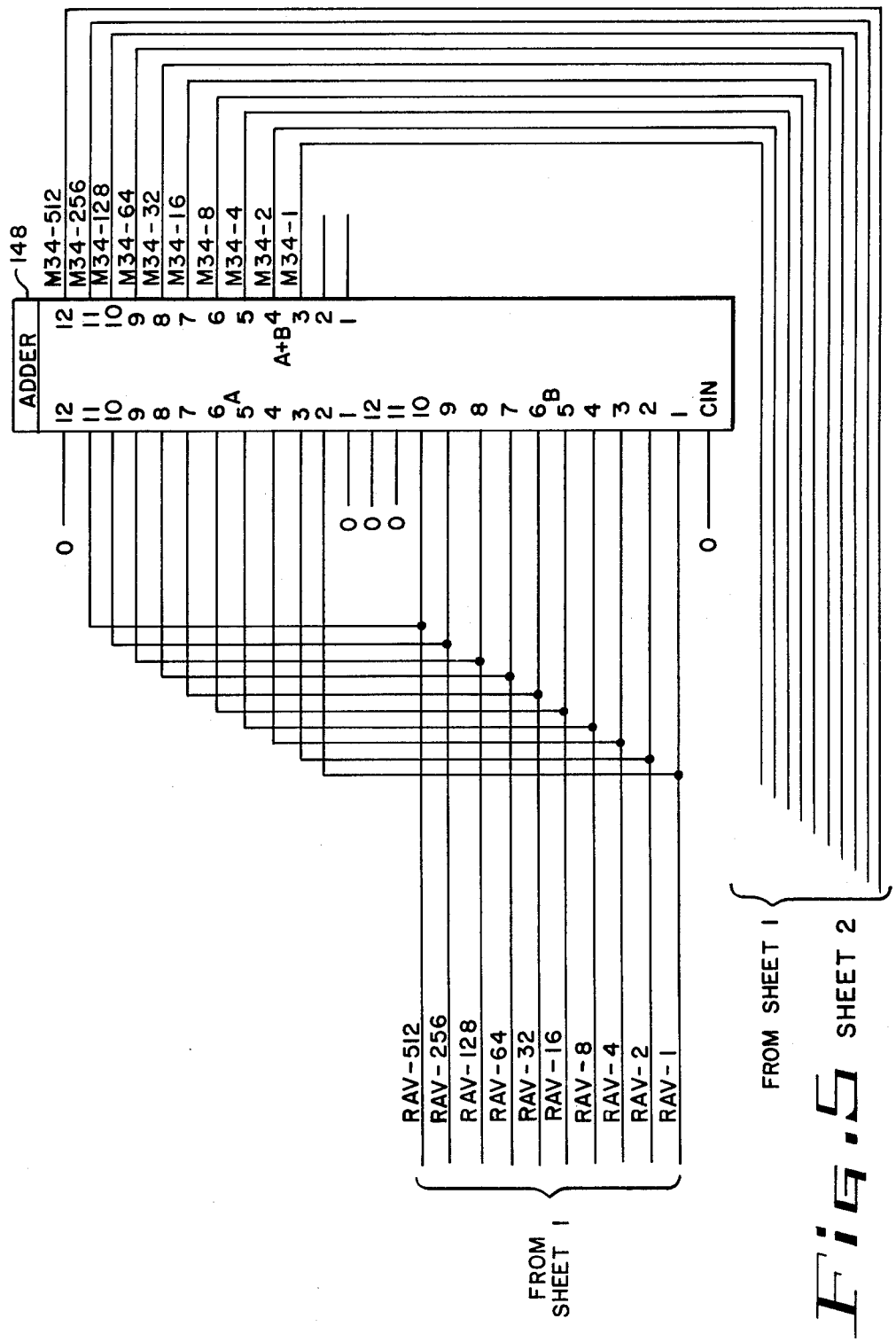
FIG. 5 is a logic diagram of an average integrator used in the data rate detector of FIG. 1.

Referring to FIG. 5, there is shown a logic diagram of the average integrator section of the data rate detector. The average integrator accumulates a forty frame count in a register 144 (RAV). This is done by multiplication of the first ten frame count by four by means of switch 136. It is next necessary to determine three-fourths of the old forty frame count and add to that the new ten frame count in order to determine a new forty frame count. This is accomplished as follows. The old forty frame count contained in RAV register 144 is applied to first and second sets of inputs of adder 148 in order to perform a multiplication by three. By dropping the two least significant bits, as shown in FIG. 5, at the adder output, a shift by two is accomplished which is equivalent to a division by four. The adder output is therefore three-fourths of the existing 40 frame count.

A second adder 138 adds the contents of adder 148 to the new ten frame count contained in switch 136 having inputs coupled to the outputs of adder 114 in FIG. 4. The select input of switch 136 is coupled to the RUN signal generated by AND gate 122 in FIG. 4. The output of adder 138 is the new 40 frame count (RES). This new count is then loaded into register 144.

The six most significant bits of the output of adder 138 are applied to the inputs of decode 140 to produce the ZONE field ZONE 0-4. This decode unit is composed of logic which produces the ZONE field in accordance with Table 1.

Table 1

| ZONE DECODE | | | | | | | | | | |
|---|---|---|---|---|---|---|---|---|---|---|
| RES- | | | | | | ZON- | | | | |
| 512 | 256 | 128 | 64 | 32 | 16 | 0 | 1 | 2 | 3 | 4 |
| 0 | 0 | X | X | X | X | 0 | 1 | 1 | 1 | 0 |
| 0 | 1 | 0 | 0 | X | X | 0 | 1 | 1 | 1 | 0 |
| 0 | 1 | 0 | 1 | 0 | 0 | 0 | 1 | 1 | 1 | 0 |
| 0 | 1 | 0 | 1 | 0 | 1 | 0 | 1 | 1 | 1 | 1 |
| 0 | 1 | 0 | 1 | 1 | 0 | 1 | 0 | 0 | 0 | 0 |
| 0 | 1 | 0 | 1 | 1 | 1 | 1 | 0 | 0 | 0 | 1 |
| 0 | 1 | 1 | 0 | 0 | 0 | 1 | 0 | 0 | 1 | 0 |
| 0 | 1 | 1 | 0 | 0 | 1 | 1 | 0 | 0 | 1 | 1 |
| 0 | 1 | 1 | 0 | 1 | 0 | 1 | 0 | 1 | 0 | 0 |
| 0 | 1 | 1 | 0 | 1 | 1 | 1 | 0 | 1 | 0 | 1 |
| 0 | 1 | 1 | 1 | 0 | 0 | 1 | 0 | 1 | 1 | 0 |
| 0 | 1 | 1 | 1 | 0 | 1 | 1 | 0 | 1 | 1 | 1 |
| 0 | 1 | 1 | 1 | 1 | X | 1 | 0 | 1 | 1 | 1 |

Table I-continued

| ZONE DECODE | | | | | | | | | | |
|---|---|---|---|---|---|---|---|---|---|---|
| RES- | | | | | | ZON- | | | | |
| 512 | 256 | 128 | 64 | 32 | 16 | 0 | 1 | 2 | 3 | 4 |
| 1 | X | X | X | X | X | 1 | 0 | 1 | 1 | 1 |

The resultant ZONE field is stored in ZONE register 142 between updates. The clock input of register 142 is coupled to the $RIOFR signal generated by AND gate 132 of FIG. 4. The clock input of register 144 is coupled to the $RAV signal generated by gate 134 of FIG. 4. Both the RESET inputs of register 142 and 144 are coupled to the RST-AVE signal generated by OR gate 82 in FIG. 4.

Figure 6:
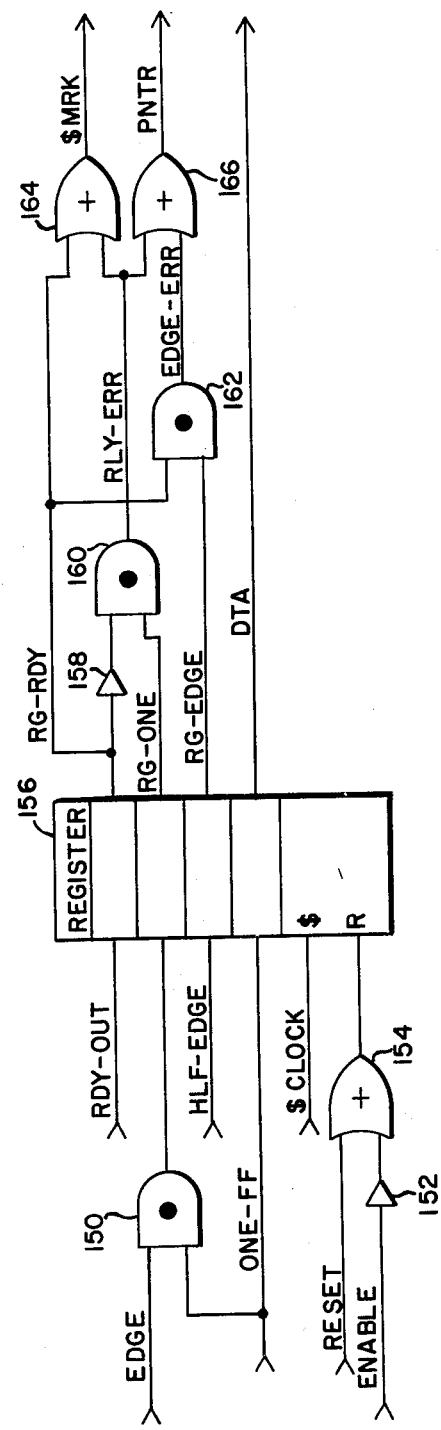
FIG. 6 is a logic diagram of the output conversion unit of FIG. 1.

The output conversion unit of FIG. 1 is shown in more detail in FIG. 6. It uses the signals as provided by the various units discussed previously and provides an output which is compatible for use by the host system. The EDGE signal and the output of flip flop 56 (FIG. 3) ONE-FF are applied to first and second inputs to AND gate 150, the output of which is applied to register 156 as is the RDY-OUT signal (FIG. 3), the ONE-FF signal (FIG. 3) and the HLF-EDGE SIGNAL (FIG. 2). The clock input of register 156 is coupled to the system clock and the RESET input of register 156 is coupled to the output of OR gate 154 having a first input coupled to the system reset and second input coupled to the system enable signal after inversion in inverter 52. The signal ONE-FF forms the data output level signal (DTA) as discussed earlier. An early error signal (RLY-ERR) is generated by AND gate 160 having a first input coupled to the RDY-OUT signal stored in register 156 (RG-RDY) after inversion in inverter 158 and a second input coupled to the ONE-FF signal stored in register 156 (RG-ONE). If either the RG-RDY or the RLY-ERR signal should become true, an output strobe ($MRK) is transmitted by OR gate 164. AND gate 162 has applied to its first input the RG-RDY signal and to its second input the EDGE signal as stored in register 156 (RG-EDGE). An indeterminate EDGE error (EDGE-ERR) is generated by AND gate 162 if both the RG-EDGE signal and the RD-RDY signal occurs simultaneously. If either the RLY-ERR signal or the EDGE-ERR signal occurs, a possible error pointer (PNTR) is generated by OR gate 166 and is transmitted with the data.

This circuit will remain inoperable if a system reset is present of if an enable data recovery (ENABLE) from the host system is in the OFF or false state.

While the principles of the invention have now been made clear in an illustrative embodiment, there will be many obvious modifications of the structure, proportions, materials and components without departing from those principles. The appended claims are intended to cover any such modifications.

What is claimed is:

1. A digital data recovery system controlled by a system clock for decoding GCR input data bits stored on magnetic media in the form of flux reversals with no more than two successive zeros throughout a data record, comprising:
    a first means for monitoring an input data signal from a magnetic storage media for flux reversals and generating an EDGE signal for each transition of the input data;
    a second means responsive to said EDGE signal for enabling the data recovery system when a predetermined number of said EDGE signals have been received and for generating a HLF-EDGE signal when a transition occurs during the first half clock cycle;
    a third means responsive to said EDGE signal and a ZONE signal representing the average data rate in clock periods between previous output data bits for comparing the incoming signal with previous output data to signal when to output a data bit as via a RDY-OUT signal and what logical state to give it via a ONE-FF signal;
    a fourth means responsive to said RDY-OUT signal for generating a ZONE signal representing the average time between a predetermined number of previous output data bits;
    an output means responsive to said EDGE, RDY-OUT, ONE-FF and HLF-EDGE signals for generating an output data bit from said ONE-FF signal and a strobe signal $MRK from said RDY-OUT signal and for generating an error condition pointer signal PNTR and a strobe signal $MRK when a predetermined condition exists between the input data represented by EDGE and HLF-EDGE and the output data represented by RDY-OUT.

2. A digital data recovery system according to claim 1 wherein said first means includes fifth means for detecting transitions of the input data.

3. A digital data recovery system according to claim 2 wherein said first means includes sixth means for detecting transitions of said input data which occur during the first half of a system clock period.

4. A digital data recovery system according to claim 2 wherein said first means includes filtering means for eliminating short duration excursions of the input data.

5. A digital data recovery system according to claim 3 wherein said first means includes synchronizing means for synchronizing the input data with said system clock.

6. A digital data recovery system according to claim 3 wherein said third means comprises:
    first counting means for counting the number of clock periods between successive input data transitions;
    comparing means coupled to said first counting means for generating a signal when the contents of said first counting means exceeds the number of clock periods in an average data period; and
    control means for preloading said first counting means with one of a plurality of predetermined numbers depending upon the past history of data bits.

7. A digital data recovery system according to claim 6 wherein said fourth means comprises:
    a rolling ten-frame count generator for counting the number of clock periods consumed by the last ten data frames; and
    integrating means for integrating the contents of said rolling ten-frame count generation to produce the average data rate.

8. A digital data recovery system according to claim 7 further including seventh means for updating said rolling ten-frame count generator for each data frame.

9. A digital data recovery system according to claim 7 wherein said rolling ten-frame count generator comprises:
    subtracting means for subtraction of the number of clock periods in the tenth most recent data period from the number of clock periods consumed by the last ten data frames; and adding means for adding the number of clock periods in the most recent data frame to the number of clock periods in the last nine data frames.

10. A digital data recovery system according to claim 9 wherein said subtracting means comprises:
- second counting means for counting the number of clock periods in each data frame;
- a first-in first-out register coupled to said second counting means for storing the counts corresponding to the number of clock periods in each data frame for the last ten data frames;
- a first register storing the cumulative number of clock periods in the last ten data frames; and
- a subtractor having a first set of inputs coupled to the output of said first in-first out register and a second set of inputs coupled to the output of said first register for subtracting the number of clock periods in the tenth most previous data frame from the cumulative number of clock periods.

11. A digital data recovery system according to claim 10 wherein said adding means includes a first adder having a first set of inputs coupled to the output of said second counting means and a second set of inputs coupled to the output of said subtractor for adding the number of clock periods in the last data frame to the number of clock periods in the previous nine data frames.

12. A digital data recovery system according to claim 11 wherein said integrating means comprises:
- a second register for storing the accumulated number of clock periods in the last forty data frames;
- multiplying means coupled to the output of said second register for generating signals corresponding to a binary representation of 75% of the forty frame count;
- eighth means for storing the number of clock periods in the last ten data frames; and
- a second adder having a first set of inputs coupled to the output of said eight means and a second set of "1" inputs coupled to the output of said multiplying means for determining a new forty frame count.

13. A digital data recovery system controlled by a system clock for decoding group coded input data bits stored on magnetic media in the form of flux reversals wherein a "1" is represented by a flux reversal and an "0" is represented by the absence of a flux reversal with no more than two successive zeros through the data record, comprising:
- a first means for receiving data from a magnetic storage media in the form of a logic signal which changes polarity as a result of flux reversals on said magnetic storage media, and for eliminating short duration excursions to the opposite polarity which are of a duration less than a predetermined time between two successive flux reversals, said first means also for generating an EDGE signal of a predetermined period for every transition of the input data, and for generating a HLF-EDGE signal of a predetermined duration for every transition of the input data which occurs during the first half of a clock period;
- a second means for receiving said EDGE signal and for generating an ENV-UP signal to enable said digital data recovery system after a predetermined number of EDGE signals have occurred indicating that data will follow, said predetermined number of EDGE signals corresponding to the number of pulses in the preamble of a data group, and said second means for detecting the termination of said EDGE signals and for terminating said ENV-UP signal a predetermined time later;
- a third means for receiving said EDGE and ENV-UP signals and a ZONE signal representing the average data rate, said third means for measuring the amount of time between successive EDGE signals and for comparing this with the immediate past history of data output by said data recovery system and with said ZONE signal so as to signal the appropriate time to generate an output signal via a signal RDY-OUT and the polarity of the output via a signal ONE-FF, and said third means for generating a POSN-15 signal indicating that a predetermined number of clock periods have passed since the occurrence of the last EDGE signal;
- a fourth means coupled to said RDY-OUT, said POSN-15 and said ENV-UP signals for converting said RDY-OUT signal to said ZONE signal representing the average number of system clock periods per data frame where said POSN-15 and ENV-UP signals serve to reset said fourth means if a predetermined condition is met;
- an output means coupled to said RDY-OUT, ONE-FF, EDGE, HLF-EDGE, and ENV-UP signals for generating an output data signal DTA and for generating a strobe signal $MRK and an error condition signal PNTR, said output means activated by said ENV-UP signal, and for generating said DTA output signal directly from said ONE-FF signal and a corresponding strobe $MRK when a predetermined condition of said ONE-FF, EDGE and RDY-OUT signals occurs, and said output means for generating said error condition signal PNTR upon occurrence of a predetermined condition of said RDY-OUT, EDGE, ONE-FF and HLF-EDGE signals, and for generating said strobe signal $MRK upon occurrence of a predetermined condition of said RDY-OUT, EDGE and ONE-FF signals, said DTA and $MRK signals for use by a host system in determining what data was stored on said magnetic media and said $MRK and PNTR signals for use by said host system in determining whether an error condition during the data recovery operation has occurred.

14. A digital data recovery system controlled by a system clock for decoding group coded input data bits stored on magnetic media in the form of flux reversals with no more than two successive zeros throughout a data record, comprising:
- a first means for receiving data from magnetic storage media by monitoring a logic signal which changes with flux reversals on said media and for generating an EDGE signal for every transition of the input data;
- a second means for receiving said EDGE signal and for sensing when a predetermined number of said EDGE signals have occurred and for generating an ENV-UP signal to inform said data recovery system that valid data is coming in;
- a third means responsive to said EDGE and ENV-UP signals and a ZONE signal representing the average number of clock periods between incoming data bits over a predetermined number of bits in the recent past, said third means for comparing the EDGE signal with said ZONE signal when ENV-UP enables the system in order to predict the actual data written on the magnetic storage media so that the correct time and logical state of the output data can be determined, said third means for signalling the appropriate time for output of a data bit via a RDY-OUT signal and the logical state of this output bit via a ONE-FF signal, and for generating a POSN-15 signal indicating that a predetermined number of clock periods have passed since the occurrence of the last EDGE signal;

a fourth means responsive to said RDY-OUT, said POSN-15, and said ENV-UP signals for counting the number of clock periods between each occurrence of said RDY-OUT signal and for storing a predetermined number of said counts as the past history of the data output of said data recovery system and for averaging these counts and for generating said ZONE signal representing the results of said count;

an output means active upon activation of said ENV-UP and a data request signal ENABLE from a host system utilizing said data recovery system, said output means responsive to said RDY-OUT, ONE-FF, EDGE and HLF-EDGE signals for converting said ONE-FF signal to an output data signal DTA and for generating an output strobe signal $MRK when said RDY-OUT signal occurs, and for generating an error condition signal PNTR when the relationship between the input data EDGE and HLF-EDGE and the output data RDY-OUT indicates an error might have occurred.

* * * * *